United States Patent

Briant et al.

[11] Patent Number: 6,132,630
[45] Date of Patent: Oct. 17, 2000

[54] METHODS FOR WASTEWATER TREATMENT

[75] Inventors: John Charles Briant, Lafayette, La.; Ronald P. DeBenedetto, Wilmer, Ala.; Barbara L. Baker, Baton Rouge, La.

[73] Assignee: Tuboscope Vetco International Inc., Houston, Tex.

[21] Appl. No.: 09/024,206

[22] Filed: Feb. 17, 1998

[51] Int. Cl.$^7$ .............................. C02F 1/00; C02F 1/02; B01D 21/26

[52] U.S. Cl. .......................... 210/774; 210/787; 210/806; 494/37

[58] Field of Search .................... 210/714, 787, 210/806, 181, 182, 304; 175/66; 494/43, 51, 37, 52, 53.54, 37.44

[56] References Cited

U.S. PATENT DOCUMENTS

| | | |
|---|---|---|
| D. 296,027 | 5/1988 | Dietzen .................................... D34/39 |
| D. 337,809 | 7/1993 | Dietzen .................................... D23/202 |
| 3,003,347 | 10/1961 | Morris et al. . |
| 3,192,155 | 6/1965 | Bready et al. ........................... 210/705 |
| 3,378,018 | 4/1968 | Lawter . |
| 3,502,215 | 3/1970 | Cahan . |
| 3,510,890 | 5/1970 | Estabrook . |
| 3,515,507 | 6/1970 | Estabrook . |
| 3,841,116 | 10/1974 | Klein et al. .............................. 68/12 R |
| 3,954,611 | 5/1976 | Reedy ..................................... 210/182 |
| 4,108,768 | 8/1978 | Sebelik et al. . |
| 4,211,650 | 7/1980 | Thomas . |
| 4,211,651 | 7/1980 | Thomas . |
| 4,211,652 | 7/1980 | Thomas . |
| 4,626,237 | 12/1986 | Galloway, Jr. ........................... 494/37 |
| 4,652,368 | 3/1987 | Ennis et al. .............................. 210/97 |
| 5,076,937 | 12/1991 | Montgomery ........................... 210/705 |
| 5,080,721 | 1/1992 | Flanigan et al. ........................ 210/787 |
| 5,124,049 | 6/1992 | Maness .................................... 210/715 |
| 5,207,922 | 5/1993 | McFarlan et al. ...................... 210/708 |
| 5,402,857 | 4/1995 | Dietzen ..................................... 175/66 |
| 5,439,489 | 8/1995 | Scalliet et al. ............................ 44/281 |
| 5,443,717 | 8/1995 | Scalliet et al. .......................... 208/131 |
| 5,564,509 | 10/1996 | Dietzen ..................................... 175/66 |
| 5,641,071 | 6/1997 | Read et al. ................................. 209/3 |
| 5,643,169 | 7/1997 | Leung et al. .............................. 494/53 |
| 5,800,729 | 9/1998 | Wehrle et al. ........................... 210/787 |

OTHER PUBLICATIONS

"Sweco Oilfield Services, A Division of Environmental Procedures, Inc.," Environmental Procedures, Inc., 1995.

"Separation Through Technology—Composite Catalog," Brandt EPI, Feb. 1996.

"SC 35 HS High Speed Decanting Centrifuge," Sweco Oilfield Services, 1995.

"New Technology In Automated Wastewater Systems," Environmenta Procedures, Inc., 1996.

"Fluid Processing Equipment For the Drilling & Environmental Industries," Tri–Flo Int'l Inc., 1996.

"Pressure Control Solids Control Rig Instrumentation," Swaco Geolograph, Dec. 1993.

*Primary Examiner*—David A. Reifsnyder
*Attorney, Agent, or Firm*—Finnegan, Henderson, Farabow, Garrett & Dunner, L.L.P.

[57] ABSTRACT

A method has been invented for separating components of a wastewater stream, the stream containing water, oil (e.g. heavy oil and/or light oil), undesirable organic material (solid and/or liquid), and contaminating solids, the method including feeding a wastewater stream to a first pretreatment unit producing a first pretreated stream, feeding the first pretreated stream to a first centrifuge for centrifugal separation, producing a first liquid centrifuged stream, and a second liquid stream, and feeding the first liquid centrifuged stream to a second centrifuge producing a resultant centrifuged stream of recoverable oil and a water phase centrifuged stream which can be treated further or fed back to a source for re-use. The source may be a facility from the group including refineries, chemical plants, paper mill plants, and oil and gas processing facilities.

18 Claims, 1 Drawing Sheet

METHODS FOR WASTEWATER TREATMENT

BACKGROUND OF THE INVENTION

1. Field of the Invention

The present invention is directed to wastewater treatment systems methods, and in certain aspects, to systems for separating oil, water and solids in production fluids of oil and gas wells. In other aspects, the present invention is directed to systems for treating wastewater from petroleum refineries and chemical manufacturing facilities.

2. Description of Related Art

Stringent water quality standards impact the operations of petroleum production facilities. In certain of these operations increased feed stock throughput rates have resulted in more product being lost in wastewater streams.

In certain prior art systems, oil and gas production units pump fluid from below the earth's surface from a hydrocarbon bearing formation. The fluid typically is a mixture of oil, water, gases, and solids (e.g. sand or rock). The mixture then is separated first to recover or remove gases using, e.g., a pressure separator, either of a high or low pressure design. Once the gases are removed, a resulting liquid/solid phase is pumped through an oil-water separator. In certain aspects such a separator is basically a settling tank equipped with baffles designed to promote the separation of oil from the water and solids. Oil is removed from the top of the tank while water and solids are pumped from the bottom. The degree of efficiency to which the oil-water separator operates affects the amount of oil remaining in the water-solids portion. The water and solids may be disposed of together by deep well injection or are segregated if other disposal options are required.

Efforts are made in certain prior art systems to isolate refinery and petrochemical process wastewater from desired petroleum or chemical compounds. Such wastewater is collected and treated prior to disposal. Solids removed from the wastewater system (which may include tanks, sumps, and flow lines) must be treated according to governing waste regulations. Certain of these solids are hazardous wastes as defined by the U.S. Environmental Protection Agency. In certain aspects when the process wastewater enters a sump system it is pumped to an API separator which is similar in design to the settling tank used in the oil production field described above. Recovered oil is skimmed off the top of the separator while water is removed from the middle section and a sludge-solids mixture is pumped off the bottom. The recovered oil, called slop oil, is pumped to the slop oil storage tank and later refined or otherwise reused in the process units. The wastewater is treated to remove contaminates, usually in a biological treatment plant, and discarded to the public waters under a government permit. The separator sludge, along with any solids removed from the wastewater storage system and sludge from a DAF (Dissolved Air Floatation Unit) in the wastewater treatment plant are typically hazardous wastes which are managed accordingly. Since separated fractions from the treated wastewater proceed to other units for further processing, the amount of allowable contamination is critical. Severe unit upsets, poor product quality, and excessive amount of wastes often are the result of an incomplete separation of oil, water and sludge in the separator process. This new invention greatly improves this separation process and will replace API separators and DAF units in refineries and petrochemical facilities.

There has long been a need for effective and efficient treatment and separation methods and systems for wastewater from refineries and petrochemical facilities, and, particularly for such methods and systems at the location of wastewater generation. There has long been a need for such systems and methods that produce reusable, recyclable material. There has long been a need for such systems and methods in which the production of hazardous waste is reduced or minimized. There has long been a need for such systems and methods with which levels of fouling contaminants are reduced.

SUMMARY OF THE PRESENT INVENTION

The present invention, in certain embodiments, teaches a system for recovering components from an oil and gas produced water stream or a refinery-petrochemical wastewater stream, the system including: pretreatment apparatus for conditioning a wastewater stream prior to entering a centrifuge system for liquid/liquid separation, the centrifuge in one aspect being a stack disk centrifuge; a decanting centrifuge for a liquid/solids separation; and a solids holding unit. In one aspect a tricanter oil/water/solids separator unit is also used. In one particular aspect, the present invention discloses such a system for the separation of crude oil from water produced with the oil from a production well. In another particular aspect, the present invention discloses a system for recovering waste oil from a refinery or petrochemical process wastewater stream followed by the separation of solids from said wastewater stream.

In one aspect such a system uses a decanting two phase and/or three phase centrifuge for a liquid/solids or water/oil/solids separation. In one particular aspect, the present invention discloses such a system for the separation, segregation of the light end oils, crude, water and solids (rust, sand, clays paraffin, rock particles) created with the oil from a production well thereby reducing shut in time for production facilities and lowering costs for the final treatment of the water phase to meet federal and state discharge standards.

In one aspect, methods according to the present system produce wastewater from which contaminating organic material has been removed down to a level of about 500 parts per million or less; and, in one aspect, to 100 parts per million or less; with solids removed having a largest dimension of 100 microns, 25 microns, 5 microns, or 1 micron.

It is, therefore, an object of at least certain preferred embodiments of the present invention to provide:

New, useful, unique, efficient, nonobvious systems and methods for recovering components (solid and/or liquid) from produced wellbore fluids and from process wastewaters;

Such systems and methods for treating such fluids and such wastewater at the location of generation;

Such systems and methods which reduce the need for injection wells for injecting such fluids and such wastewater;

Such systems and methods that produce reusable, recyclable material and, in one aspect, at the point of generation;

Such systems and methods which effectively minimize the development of hazardous material in process streams; and Such systems and methods which effectively reduce treatment cost at a final wastewater discharge point and optimize present wastewater treatment plants.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other placement, structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

BRIEF DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

Figure 1:
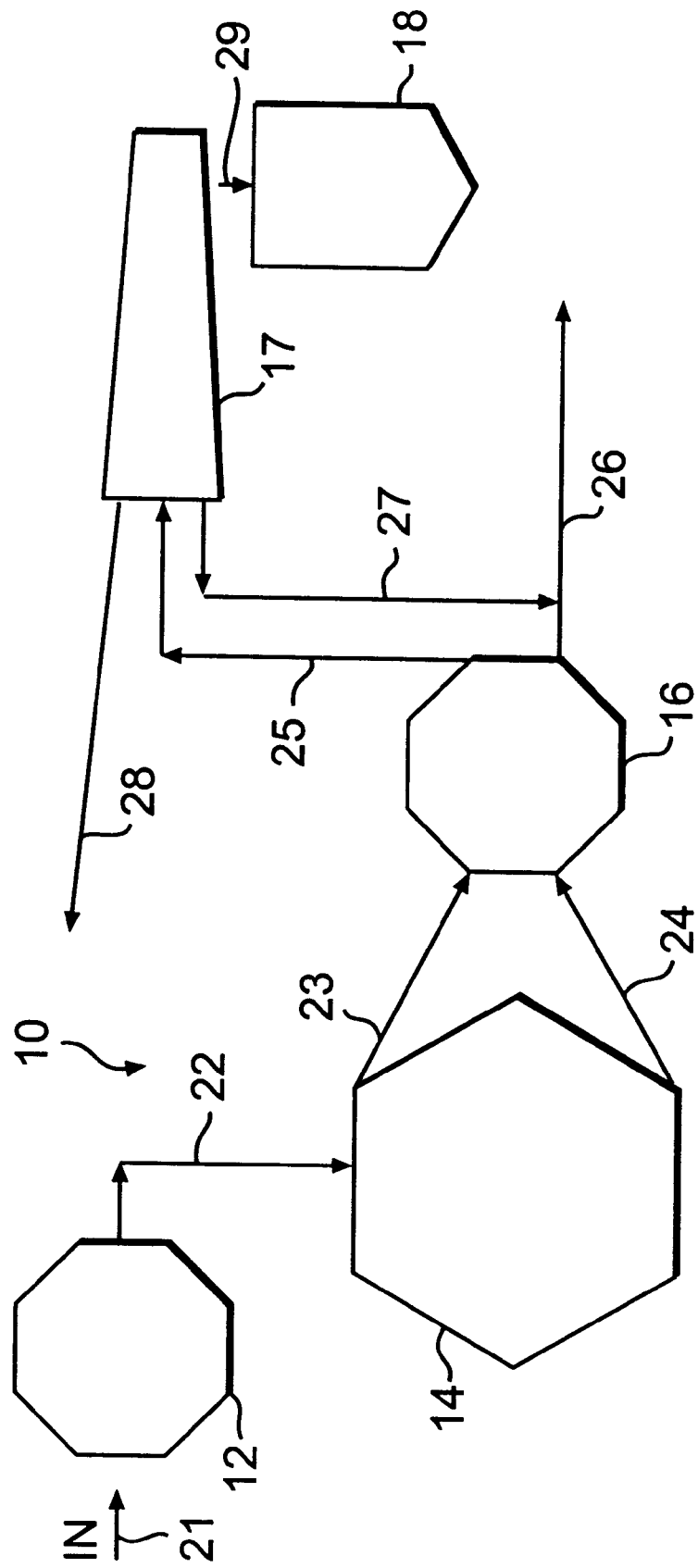
FIG. 1 is a schematic view of a system according to the present invention.

FIG. 1 shows a system 10 according to the present invention in which a wastewater stream (e.g. from a refinery or from a chemical production facility) is fed in an inlet line 21 to a pretreatment system 12 which conditions the stream before entering a centrifuge 14. A variety of pretreatments are performed depending on physical and/or chemical analysis of the inlet wastewater including, but not limited to, temperature adjustment, pH adjustment, solvent addition, flocculation, gravity segregation, shearing, and/or chemical enhancements. Some or all of these operations may be performed in any combination. In one aspect, flow diagrams for an existing system are studied to ascertain flow therethrough, e.g. in gallons per minute or barrels per minute. This information is utilized in the sizing of the equipment, equipment selection and the order of placement of each piece of equipment. In one aspect, samples of insitu materials are collected at generation points, collection points, and transfer points at a facility/production sites. Samples gathered are tested in accordance with American Petroleum Institute—ASTM Standards testing methodology and include (but are not limited) the following tests described below, depending on the application and final discharge requirements:

Sample tests may include: centrifuge spinout (for BS&W/ Basic sand and water content); particle analysis (Microtrak Computer—average particulate size of feed stream); sieve analysis (Screening particulate indicator); and mass balance (% solids/liquid/hydrocarbons by weight). Tests are run without any treatment additives; then with treatment additives, e.g., emulsion breakers, polymers, acids, lime, quick gel to ascertain part per million treatment and treatment methodology, i.e. injection points, shear resistance, flocculant points. Appropriate chemicals are used as accelerants and enhancers in the separation process i.e. to segregate and grow smaller particles for better removal by the equipment; break water in oil emulsions, and/or raise or lower the pH of the materials. Applicable tests are fun for flash point on the insitu material to verify the temperature to which it can be safely heated. This gives a parameter for using heat as a further enhancer for attaining optimum breakage in liquid/liquid emulsions.

In one aspect, a system design configuration is prepared with applicable modifications to suit the materials and process flows. On site testing with the chosen equipment is done and samples are retrieved from this testing. Modifications can include (but are not limited to) the modifications discussed below:

Treatment/mix and separation tankage modified with agitators designed for minimum settling of solids; weirs and skimmers for oil recovery and port discharge points for level segregation of emulsified liquid phases; tanks with flat bottom, round bottom or cone bottom depending on application; tanks placed in series or at specific points throughout the process for separation and/or clarification purposes;

Pump system utilized for flow capacities and non-pulsating continuous feed and discharge points are configured off the tanks at points/levels that allow for sheared, heated, and/or treated material to be pulled off in phases and like phases to be treated in a homogeneous phase through the mechanical devices best suited to achieve final separation and recovery of oil/water/solids;

Heat source and chemicals to enhance a system as the application and materials being processed dictate at various points; and Parallel filtration with metals removal and water phase polarity alteration capability; high "g" liquid/liquid particulate separator to congregate and grow finer particulates at high flow rates, send the particulates with the chosen liquid stream, and separate the lighter and heavier streams; a liquid/solid separator for the removal of solids from the heavier liquid streams; a tricanter polishing system for final product recovery, liquid/waste/product separation; and alternation of the system to fit specific density, viscosity of materials and flows.

In one aspect, the centrifuge 14 is a stack disk centrifuge specifically selected from any of several manufactured models. The unit selected is based upon the physical and chemical analysis of the entering stream, required flow rates, pressures, temperatures, which will produce a homogeneous flow to the liquid/liquid separator and enhance separation of two liquids of different densities under high g force. Accessory equipment (such as disc plate and nozzle jet assortment; soft starters and explosion proof motors) needed to properly maintain and operate under specified conditions may be used. Density and viscosity of phases contribute to the choice of nozzles used and placement of disc within the centrifuge unit. Finer particles are accumulated within the underflow via the settings on the machine as a "cut point".

The pretreatment system 16 is like the system 12. The unit selected is based upon the physical and chemical analysis of the entering stream, required flow rates, pressures, temperatures, which will produce a homogenous flow to the liquid/liquid separator and enhance two liquids of different densities to be separated under high "g" force. High "g" decanter technology is utilized in combination with the stack disc technology when a higher solids load needs to be removed from the incoming stream before entering the stack disc. High "g" tricanter technology is utilized usually following the stack disc at lower flow (gallons per minute) capability of polish the overflow phase and thereby returning a product back to a refinery that is reusable and less laden with total suspended solids that could increase fouling of process equipment. ("polish" means removal of solid particles and water from an overflow stream including oil; in one aspect, methods according to this invention remove fine particles, preferably to a content by weight of 5% or less BS&W). In one aspect the overflow phase in line 23 is about 80% oil by volume and about 20% water and solids; the underflow phase in line 24 is about 3% by volume dissolved hydrocarbons and about 97% water and suspended solids. In another aspect, without pretreatment in pretreatment system 16, the underflow phase, due to treatment in the centrifuge 14 has less than 100 parts per million undesirable organics (solids and/or liquids) or 99% or less by volume and can be fed in the line 26 for further treatment or, alternatively, can be re-used in a refinery. The water phase in line 26 may be treated further, e.g. (but not limited to) salt removal, pH adjustment, ammonia removal, and/or further removal of dissolved organics. The pretreatment system 16 may include separate sub-systems and/or tanks or vessels for conducting some or all of the possible pretreatments described herein.

The pretreatment system 12 makes the material entering the system as homogenous as possible and the material is treated to modify the density/viscosity of the liquid phases to enhance the high "g" separation that will take place in the centrifuge 14. Modifications may include suspending fine particles in the flowable liquids without creating tighter emulsions. Pretreatment system 16 may be designed to handle a light liquid phase and a higher density liquid phase (e.g. oil/solids with a small amount of remaining water). The light liquid phase (mostly water in some aspects) is gathered and pumped off to wastewater for final treatment and discharge and the oil phase now laden with fine solids particles is treated with appropriate known chemicals to enhance oil recovery by the Tricanter Centrifuge. The pretreatment may involve one or more tanks or vessels each with a skimmer to remove available good oil with BS&W level meeting recovery specifications (5% or less BS&W). This reduces the amount of material that is run through the tricanter centrifuge. In certain aspects five percent or less BS&W oil is sent back to refinery system for reuse and an effluent phase back to wastewater for final treatment and discharge.

The solids finally captured through this system may be augured into containers for final disposition. The pretreatment system 16 may include lowering of the hydrocarbon content in the solids phase to prepare it for coker fuel as a means for disposal.

The centrifuge 17, in one aspect, is a solid bowl, horizontal centrifuge, either a decanter or tricanter in design, which has been equipped with auxiliary equipment to treat a two or three-phase liquid/liquid/solids separation. The centrifuge may include apparatus to allow for variable speed backdrive, i.e., speed and differential settings without turning off the centrifuge, which are installable on the bowl, on the scroll or on both. Centrifuge gear boxes may be quipped with mechanical devices for manual setting, and in different sized for slower or faster settings. Cylindrical bowls may be used in which a scroll resides that uses fast rotation to separate sludge solids and liquid phases. The material entering such a centrifuge is forced against the bowl's interior walls, forming a pool of liquid and sludge solids. Density differences cause the sludge solids and the liquid to separate into two distinct layers. Scrolls may be used that turn inside a bowl a centrifuge and that auger out materials. Auxiliary equipment enhancements include, but are not limited to, variable drive bowl speed, variable drive scroll, differential settings, and explosion proof motors in any combination. Auxiliary centrifuge equipment may include telescoping stands, e.g. of steel, to telescope the centrifuge to different levels at a job site. The centrifuge is craned to the top once it is set up and is then at a desired height to auger solids into a receiving vessel. Preferably the stand has a minimum footprint to accommodate available facility space. Telescoping augers are used and can be extended (e.g. up to 12 feet), from a centrifuge discharge point to reach over solids containers. Such augers can be broken down in sections or extended over two or more receiving boxes for maximum efficiency. Tanks can be modified with weirs (overflow and underflow) e.g. corrugated and non-corrugated plates set at optimum positions to achieve phase separation. Agitators with commercially available motorized paddles for material agitation at low and high speeds may be used to enhance phase separation and minimize the possibility of creating tighter emulsions. Discharge points and portholes may be strategically placed for sample taking and pump off of stratified phases when necessary. Mechanized and non-mechanized skimming apparatus may be used in any pretreatment for collection of developing free oil throughout the system.

The vessel 18 accommodates any after-treatment of the solids flowing in the stream in line 29 from the centrifuge 17 (for reuse or disposal). The vessel 18 may include, but is not limited to, a commercially available roll-off box, mix tank, dryer or grinder, or any combination thereof. The stream in line 29 may be analyzed to determine possible further treatments, e.g. drying. In one aspect, solids from the vessel 18 are hauled off for disposal. In another aspect in a refinery with a coker, the solids are made into coker quench feed and burned.

In one aspect, process wastewater from a refinery unit enters the pretreatment system 12 in the inlet line 21. In one aspect heat, chemicals, agitation, weirs and skimmers are employed. From the pretreatment unit 12 a resulting stream 22 including water/oil/suspended solids is pumped to the centrifuge 14 in which a liquid/liquid with suspended solids separation takes place. A recovered oil phase from the centrifuge 14 is sent to the pretreatment unit 16 for further treatment as described above. The resulting stream then flows in line 25 to the centrifuge 17 for separation into oil, water and solids phases. Recovered water flows in a line 27 to a line 26 from the pretreatment unit 16 which is then pumped to a wastewater treatment plant for further known treatment and processing (or, alternatively, pumped back to a refinery for re-use). The stream in the line 26 is, preferably, at least 99% water by volume. Oil from a three-phase separation in the centrifuge 17 is sent back in a line 28 to the facility slop oil vessels for reuse. Solids from the centrifuge 17 are fed (e.g. augured) into the vessel 18 for final disposition and disposal in accordance with federal and state regulations. In one aspect underflow in line 24 from the centrifuge 14 (a water phase) is sent to either the pretreatment unit 16, (or to either centrifuges) before being sent to the facility's wastewater treatment plant (in line 26) for final discharge.

In one aspect of a system as in FIG. 1, a stack disc centrifuge makes a cut on two liquids of different densities. The size of the nozzles and thru-put settings are determined by analyzing the cut streams and determining a water/oil cut. The first pretreatment steps promote the fines to go with the oil phase and this stream leaves the nozzle jet and is finally polished to BS&W standards by the three phase centrifuge for reuse in the refinery. The water phase may go to another breakout, skimmer tank to remove remaining heavier than water oil droplets before being pumped off to final biological/diffused air flotation treatment at the facility wastewater area. Such a wastewater final treatment is much less expensive when systems according to the present invention treat its input due to the removal of heavier oil and solid fines prior to entry to the system.

In systems such as those of FIG. 1, oil droplets coalesce in the centrifuge 14; flow to the three phase oil/water pretreatment tank from which the oil phase is sent to the three phase centrifuge and the water that breaks out is sent to the facility wastewater area; and are then retrieved with the liquid oil phase of the process in the line 28. In certain aspects this results in a reduction in the amounts of hydrocarbon contaminants (e.g. but not limited to Benzene, Toluene, Ethylene, and Xylene) remaining in the water phase by approximately 95%, and in certain embodiments, by 99% or more (by volume). A system as in FIG. 1 may be used to produce volumes of free BS&W oil from emulsion phases within the system.

Oil (crude oil, light oil, and/or heavy oil in the line 21) that is processed in one aspect by the system of FIG. 1 is treated and separated using, preferably, a three-phase centrifuge 17. In one aspect this results in recovered oil in line 28 with a 5% or less BS&W (bottoms, sediment and water). Such oil can be returned to a refinery's crude oil supply system in line 28, e.g. for use in a refinery catalytic cracking process, as coker feed, or as feed stock.

The solids and liquid contaminants which might remain in the water phase in line 26 after treatment in the system of FIG. 1 are then, in one aspect, run through a regular prior art wastewater treatment plant without further separation and are heated to achieve desirable non-hazardous material levels. In another aspect, the solids are floated or settled out in the prior art wastewater area; microbes are used to eat remaining light end hydrocarbon chains and inorganics that might remain are settled out. Ph adjustment and flocculants may aid in this final step if necessary to meet governmental discharge standards. Solids (e.g. catalytic fines, sand, coke, and/or naturally occurring materials) exiting the systems according to the present invention may be used as coker quench feed or coker blend feed material. Solids, e.g. meeting the paint filter standard and having only 4% by volume hydrocarbon content can be sent to coker quench feed preparation for particle size degradation or directly to a feed system if this step is not necessary. Solids not meeting this 4% criteria or plants that do not have a coker system may use an economic commercial disposal. Thermal processing may be used to reclassify or produce cement kiln material using these solids. Hazardous materials that can be reclassified are candidates for thermal processing if present in sufficient volumes. In this process direct fire or indirect fire is used at high enough temperatures (e.g. about 650° to 2200° F.) to reduce the contaminants in the solids to inert/non-hazardous standards by Federal and State controlled test methods. Materials entering systems according to the present invention in process situations may come from wastewater generation and/or collection points from all over a facility and may enter the facility sumps and collection points. Since it is inside a process area it has to be collected. The collection process ends up mixing rain water with various degrees of contaminants, e.g. oil and grease due to spills, turnarounds and daily maintenance activities. At the point of entry the composition of this effluent may change somewhat from day to day and the pretreatment area and/or tanks in systems described herein may also act as a "surge gate" to prepare a more homogeneous flow to centrifuges.

Water exiting the system of FIG. 1 in line 26 can be used in a refinery or other facility; e.g. but not limited to, sending it through the wastewater area or recycling it for use in tank cleanings and maintenance work in process areas. Wastes (such as, but not limited to, F-Waste, and oily waste sludges) which are normally generated in a wastewater treatment plant are not generated but are removed upstream (e.g. in centrifuges 14, 17 and related apparatus) and distributed to the recovery phase of the new process causing it to be a by product of the recovery process and not a waste. The F-Waste collection point over a period of time could be taken off line entirely causing a savings in hazardous disposal costs. This allows for increased throughput capacity in treatment plants since excess contaminants are removed upstream, thus effectively unloading the majority of the organic loading in a wastewater plant fed by line 26. The length of time for final treatment of material for discharge is greatly reduced since the incoming stream is free of all but trace elements of contaminants. The ability to recycle water from upstream treatment results in less potable water being utilized for maintenance type work and this leads to lower water costs and makes recycle/reuse plans more efficient. Systems and methods according to the present invention can acquire up to 90% more oil for reuse as compared to certain prior art processes.

Without a system according to the present invention (e.g. upstream of a prior art biological/DAF area) when plant upsets send excessive amounts of oil contaminated water through their current systems too much hydrocarbon in the stream can cause loss of capacity and microbe kills that result in problems, including tank shortages, replacement of expensive microbe inventory, and a backup to process areas. Proper use and staging of the equipment as in systems according to the present invention, make recirculation of the water phases that enhance process of oil recovery, minimizes the possibility of overly contaminated water entering biological treatment area causing bug kills, and reduces benzene levels in water (e.g. to lowest possible levels) without increasing the amount of above ground storage that would result in increased benzene NESHAP levels being recorded.

In one aspect, the underflow phase in line 24 is not fed to a single pretreatment system but is flowed to a tank or vessel, or a series thereof for separate pretreatments. One possible pretreatment (in either system 12, system 16, or both) includes heating the stream (e.g., but not limited to, to about 20° F. below the stream's flash point) and chemically treating with polymers, emulsion breakers, acid, and/or milk of lime to reduce hydrocarbons in the solid phase, e.g. but not limited to, to a level of 4% or less by volume. In one aspect such a pretreatment liquefies paraffin on solids facilitating paraffin removal.

Tables I and II present particular uses of a system as in FIG. 1, both with and without preteatment in the system 16, levels stated in parts per million.

TABLE I

|  | Benzene | Toluene | Ethylbenzene | Zylenes | TPH |
|---|---|---|---|---|---|
| Stream - line 22 | 1250 | 35,000 | 5,000 | 12,500 | 169,000 |
| Stream - line 24 | 14 | 29 | 5.3 | 44.5 | 445 |
| Stream - line 26 | 10 | 28 | 5.5 | 60 | |

TABLE II

|  | Benzene | Toluene | Ethylbenzene | Zylenes | TPH |
|---|---|---|---|---|---|
| Stream - line 22 | 7900 | 33,700 | 3,600 | 29,500 | 158,000 |
| Stream - line 24 | 26 | 62 | 8 | 265 | 265 |

"TPH" is "total petroleum hydrocarbons."

For the various streams total suspended solids (TSS), chemical oxygen demand (COD), and total organic carbon (TOC) in parts per million were as follows:

|  | TSS | COD | TOC |
|---|---|---|---|
| Stream - line 22 | 740 | 8440 | 540 |
| Stream - line 24 | 200 | 2190 | 380 |

|  | TSS | COD |  |
|---|---|---|---|
| Stream - line 24 | 6540 | 170 | |

In Table I, the pretreatment applied in the system 16 was the addition of emulsion breakers. For the streams 22, the stream was heated to between about 115° F. and 120° F. (i.e., about 20° F. below the stream's flash point). In the stream 22 of the Table II, a significant amount of free oil was present.

Results of the two test runs indicate that the hydrocarbon fractions of the wastewater stream can be successfully removed from the water. The organic loading being sent to the wastewater treatment plant (e.g. in line 26) can abe reduced significantly using this process. Benzene concentrations were reduced, by volume, by more than 99%, Total Petroleum Hydrocarbons by 99.8%, and COD and TOC by 75%. The reduction of the organic content in the wastewater appears to reduce the benzene concentration as well. This facilitates compliance with NESHAPS Regulation regarding Benzene levels. This regulation is an air regulation which requires refineries to measure the benzene concentration in wastewaters once they exit the process units. If a refinery has more than 10 tons of benzene per year in wastes it then must recover 95% of all benzene in its waste streams, including wastewater. If a facility has less than 10 tons per year of benzene in its wastes, the facility is not required to recover any benzene. These recovery systems are very costly. Systems and methods according to the present invention can significantly lower benzene concentration in wastewaters and other waste streams.

The present invention, therefore, in certain aspects, discloses a method for separating components of a wastewater stream, the stream containing water, oil, undesirable organic material, and/or contaminating solids, the method including feeding a wastewater stream to a first pre-treatment unit producing a first pretreated stream, feeding the first pretreated stream to a first centrifuge for centrifugal separation, producing a first liquid centrifuged stream, and a second liquid stream, and feeding the first liquid centrifuged stream to a second centrifuge producing a resultant centrifuged stream of recoverable oil and a water phase centrifuged stream; such a method wherein prior to feeding the first liquid centrifuged stream to the second centrifuge, feeding the first liquid centrifuged stream to a second pre-treatment unit, producing a second pretreated stream which is fed to the second centrifuge; any such method wherein the first centrifuge is a stack disk centrifuge; any such method wherein the second centrifuge is a tricanter centrifuge; any such method wherein the first pre-treatment unit is a heater and the method includes heating the wastewater stream to a temperature about 20° F. below a flash point of the stream; any such method wherein the second pre-treatment unit is a heater; any such method wherein oil includes light oil and the first centrifuge produces an overflow stream containing light oil, contaminating solids, and water and an underflow stream containing water, dissolved organic material, and suspended solids, the method including feeding the overflow stream to a second pre-treatment unit for breaking emulsions therein, feeding the underflow stream to the second pre-treatment unit for removal of water therefrom, the second pre-treatment unit producing a feed stream containing contaminating solids which is fed to the second centrifuge, and a water phase stream containing organic material and suspended solids; any such method wherein the wastewater stream contains wastewater from a source, the method including feeding the water phase stream back to the source for re-use therein; any such method wherein the source is a facility from the group consisting of refineries, chemical plants, paper mill plants, and oil and gas facilities; any such method wherein the water phase centrifuged stream contains water from a source of the wastewater stream and the method includes feeding the water phase stream back to the source for re-use therein; any such method wherein the second centrifuge produces a stream with some of the contaminating solids therein and the method including feeding the stream with some of the contaminating solids therein to a solids treatment vessel; any such method wherein the wastewater stream contains contaminating organic material and the method removes all but about 500 parts per million of said contaminating organic material; any such method wherein the wastewater stream contains contaminating organic material and the method removes all but about 100 parts per million of said contaminating organic material; any such method wherein the method removes contaminating solids with a largest dimension of at least 100 microns from the wastewater stream; any such method wherein the method removes contaminating solids with a largest dimension of at least 5 microns from the wastewater stream; any such method wherein the water phase centrifuged stream is at least 99% water by volume; any such method wherein the wastewater stream has a level of hydrocarbon contaminants and this level is reduced by at least 99% by volume in the water phase centrifuged stream; any such method wherein the wastewater stream contains an amount of benzene and the method results in produced streams in which this amount of benzene is reduced by volume by at least 99%; and any such method wherein the wastewater stream contains an amount of total petroleum hydrocarbons and the method results in produced streams in which this amount of total petroleum hydrocarbons is reduced by volume by at least 99%.

In certain aspects, the present invention discloses a method for separating components of a wastewater stream, the stream containing water, oil, undesirable organic material, and contaminating solids, the method including: feeding a wastewater stream to a first pre-treatment unit and therein heating the wastewater stream to a temperature about 20° F. below a flash point of the stream, producing a first pretreated stream; feeding the first pretreated stream to a first centrifuge for centrifugal separation, wherein the first centrifuge is a stack disk centrifuge producing a first liquid centrifuged stream, and a second liquid stream; feeding the first liquid centrifuged stream to a second centrifuge producing a resultant centrifuged stream of recoverable oil and a water phase centrifuged stream, wherein the second centrifuge is a tricanter centrifuge and wherein the water phase centrifuged stream has a level of contaminating organic material no more than about 500 parts per million; and wherein the wastewater stream contains an amount of benzene and wherein in each of the resultant centrifuged stream and water phase centrifuged stream the amount of benzene is reduced by volume by at least 99%.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized.

What is claimed is:

1. A method for separating components of a wastewater stream, the stream containing water, oil and contaminating solids, the method comprising feeding said wastewater stream to a first pre-treatment unit producing a first pretreated stream, feeding the first pretreated stream to a first centrifuge for centrifugal separation, producing a first liquid centrifuged stream, and a second liquid stream, and feeding the first liquid centrifuged stream to a second centrifuge producing a resultant centrifuged stream of recoverable oil and a water phase centrifuged stream, wherein the oil includes light oil and the first liquid centrifuged stream is an overflow stream containing light oil, contaminating solids, and water and the second liquid stream is an underflow stream containing water, dissolved organic material, and suspended solids, the method further comprising:

feeding the overflow stream to a second pre-treatment unit for breaking emulsions therein, feeding the underflow stream to the second pre-treatment unit for removal of water therefrom, the second pre-treatment unit producing a feed stream containing contaminating solids which is fed to the second centrifuge, and a water phase stream containing organic material and suspended solids.

2. The method of claim 1 wherein the first centrifuge is a stack disk centrifuge.

3. The method of claim 1 wherein the second centrifuge is a tricanter centrifuge.

4. The method of claim 1 wherein the first pre-treatment unit is a heater and the method further comprising heating the wastewater stream to a temperature about 20° F. below a flash point of the stream.

5. The method of claim 1 wherein the second pre-treatment unit is a heater.

6. The method of claim 1 wherein the wastewater stream contains wastewater from a source, the method further comprising feeding the water phase stream back to the source for re-use therein.

7. The method of claim 6 wherein the source is a facility from the group consisting of refineries, chemical plants, paper mill plants, and oil and gas wells.

8. The method of claim 1 wherein the water phase centrifuged stream contains water from a source of the wastewater stream and the method further comprising feeding the water phase stream back to the source for re-use therein.

9. The method of claim 1 wherein the second centrifuge produces a stream with some of the contaminating solids therein and the method further comprising feeding the stream with some of the contaminating solids therein to a solids treatment vessel.

10. The method of claim 1 wherein the wastewater stream contains contaminating organic material and the method removes all but about 500 parts per million of said contaminating organic material.

11. The method of claim 1 wherein the wastewater stream contains contaminating organic material and the method removes all but about 100 parts per million of said contaminating organic material.

12. The method of claim 1 wherein the method removes contaminating solids with a largest dimension of at least 100 microns from the wastewater stream.

13. The method of claim 1 wherein the method removes contaminating solids with a largest dimension of at least 5 microns from the wastewater stream.

14. The method of claim 1 wherein the water phase centrifuged stream is at least 99% water by volume.

15. The method of claim 14 wherein the wastewater stream has a level of hydrocarbon contaminants and this level is reduced by at least 99% by volume in the water phase centrifuged stream.

16. The method of claim 1 wherein the wastewater stream contains an amount of benzene and the method results in produced streams in which this amount of benzene is reduced by volume by at least 99%.

17. The method of claim 1 wherein the wastewater stream contains an amount of total petroleum hydrocarbons and the method results in produced streams in which this amount of total petroleum hydrocarbons is reduced by volume by at least 99%.

18. A method for separating components of a wastewater stream, the stream containing water, oil, undesirable organic material, and contaminating solids, the method comprising feeding said wastewater stream to a first pre-treatment unit and therein heating the wastewater stream to a temperature about 20° F. below a flash point of the stream, producing a first pretreated stream, feeding the first pretreated stream to a first centrifuge for centrifugal separation, wherein the first centrifuge is a stack disk centrifuge producing a first liquid centrifuged stream, and a second liquid stream, and feeding the first liquid centrifuged stream to a second centrifuge producing a resultant centrifuged stream of recoverable oil and a water phase centrifuged stream, wherein the second centrifuge is a tricanter centrifuge and wherein the water phase centrifuged stream has a level of contaminating organic material no more than about 500 parts per million, and wherein the wastewater stream contains an amount of benzene and wherein in each of the resultant centrifuged stream and water phase centrifuged stream the amount of benzene is reduced by volume by at least 99%.

* * * * *